United States Patent [19]
Gulley et al.

[11] Patent Number: 5,790,652
[45] Date of Patent: Aug. 4, 1998

[54] TELEPHONE STATION EQUIPMENT EMPLOYING REWRITEABLE DISPLAY KEYS

[75] Inventors: Gerald B. Gulley, Portsmouth; Patrick F. Walsh, Nashua, both of N.H.; David L. Whipple, Braintree, Mass.

[73] Assignee: Intergrated Systems, Inc., Nashua, N.H.

[21] Appl. No.: 615,591

[22] Filed: Mar. 12, 1996

[51] Int. Cl.$^6$ .................................................. H04M 1/00
[52] U.S. Cl. ...................... 379/368; 379/433; 379/356
[58] Field of Search .................... 379/355, 354, 379/216, 368, 93.17, 93.18, 93.19, 93.23, 433, 434

[56] References Cited

U.S. PATENT DOCUMENTS

| | | | |
|---|---|---|---|
| 3,879,722 | 4/1975 | Knowlton | 340/324 R |
| 4,763,356 | 8/1988 | Day, Jr. et al. | 379/368 |
| 4,885,580 | 12/1989 | Noto et al. | |
| 4,928,306 | 5/1990 | Biswas et al. | |
| 5,309,509 | 5/1994 | Cocklin et al. | |
| 5,335,276 | 8/1994 | Thompson et al. | |
| 5,402,477 | 3/1995 | McMahan et al. | |

FOREIGN PATENT DOCUMENTS

| | | |
|---|---|---|
| 0 271 280 A | 6/1988 | European Pat. Off. |
| 0 365 200 A | 4/1990 | European Pat. Off. |
| 42 03 652 A | 8/1993 | Germany |
| WO 96 02049 A | 1/1996 | WIPO |

OTHER PUBLICATIONS

Telesis (Bell–Northern Research Ltd.),No. 97, Dec. 1993, Ottawa, L. Andreasen et al: "*ADSI: The Dawn of a New Age of Interactive Services*".

*Primary Examiner*—Jack Chiang
*Attorney, Agent, or Firm*—Banner & Witcoff Ltd.

[57] ABSTRACT

Telephone station equipment consisting of a phone device interconnected with a personal computer. The phone device includes a conventional telephone handset and a keypad employing pushbutton display keys each of which has a writable keyface display for visually indicating the function of the key or other information to the user. The personal computer is connected to both the phone device and to one or more telephone communications channels and is programmed to display prompting information on the key displays and respond to keypress events to perform the functions indicated. The user can perform a variety of telephone system management tasks solely by viewing and manipulating the phone device keypad, including manual dialing, redialing, speed-dialing from a directory of commonly called numbers, making flash disconnections, forwaring calls, controlling call waiting and caller I.D. functions, adjusting speakerphone volume and microphone gain, handling conference calls, automatically logging into remote databases, recording the time and nature of each call in an accounting file, performing unattended call answering and voice mail functions, utilizing voice responsive and automated voice output systems, and other telephone management functions.

27 Claims, 8 Drawing Sheets

TELEPHONE STATION EQUIPMENT EMPLOYING REWRITEABLE DISPLAY KEYS

FIELD OF THE INVENTION

This invention relates to telephone communications and more particularly to terminal equipment operated by a user to obtain a variety of telephone services.

BACKGROUND OF THE INVENTION

In recent years, computer-based telephone management systems have been developed in which the computer itself provides the human interface to the telephone system. Such systems typically offer a host of services which replace or supplant the services provided by conventional, standalone telephone terminal equipment such as telephone station sets and facsimile machines. By adding suitable software and interface hardware, such as a data/voice/fax modem, an existing personal computer can be readily converted into a powerful communications tool for establishing conventional voice lines and for sending and receiving facsimile images and data files. Frequently, when the personal computer is coupled to a local area network, shared communications facilities can be made available via the network, eliminating the need for additional telephone interface hardware at each personal computer.

While robust telephone management and communications functions can be provided using the personal computer as the telephone terminal, users have found these systems to be difficult to use. Thus, while a given personal computer telephone management system might include a stored database of telephone numbers which can be activated and then manipulated using the computer keyboard or the mouse to select and automatically dial a desired telephone number, it is often faster and easier to simply look the number up in a published directory and then manually dial the number in the usual way. As software developers add an ever expanding set of features to such computer telephone management systems, such systems necessarily become more complex and more difficult to use, particularly for functions with are infrequently invoked.

SUMMARY OF THE INVENTION

It is a leading object of the present invention to make telephone station equipment easier to use by incorporating a special telephone keypad whose operation mimics the pushbutton telephone keypad familiar to nearly everyone, with each key incorporating a small, writable graphic display panel that reveals that key's function or supplies relevant information to the user. The keypad is connected to a control computer which responds to each key press, performing desired functions and selectively altering the information displayed by each key to prompt the user with a changing set of available choices.

In one preferred embodiment, the present invention utilizes a novel phone device which includes a conventional telephone handset consisting of a mouthpiece microphone and an earpiece speaker, a hook switch for connecting and disconnecting the handset and the line circuit, and a manually manipulatable keypad consisting of a plurality of display keys, each of which incorporates sensing means for detecting the actuation of the key by a user and a display panel for visually presenting information to the user.

A programmed computer, which may advantageously take the form of a conventional personal computer, is provided with a keypad interface circuit for transmitting key press signals indicative of the actuation of the keys to the computer and for transmitting display information from the computer to the individual key displays. A control program responsive to key press signals performs functions which are visually indicated by the various display keys, and alters the key displays to reflect the current state of the particular task being performed.

Telephone functions may be easily and intuitively selected solely by viewing and manipulating the display keypad. The keys may be used to perform conventional dialing, redialing, speed-dialing from a directory of commonly called numbers, perform flash disconnection, forward calls, control call waiting functions, adjust speakerphone volume and microphone gain control, handle conference calls, automatically log into remote databases, record each call in an accounting file, perform unattended call answering and voice mail functions, integrate voice responsive and automated voice output systems, and more, using the display keypad alone to select and activate each function.

To facilitate these and other telephone management functions, the display keypad on the phone device is preferably integrated with one or more computer control programs using an industry standard application program interface (API), permitting the novel phone device to be used to create, control and manage telephone connections required by any application program which supports the shared standard API.

These and other objects, features and advantages of the present invention will be better understood by considering the following detailed description of a preferred embodiment of the invention.

BRIEF DESCRIPTION OF THE DRAWINGS

In the description which follows, reference will frequently be made to the attached drawings in which.

DESCRIPTION OF THE PREFERRED EMBODIMENT

Figure 1:
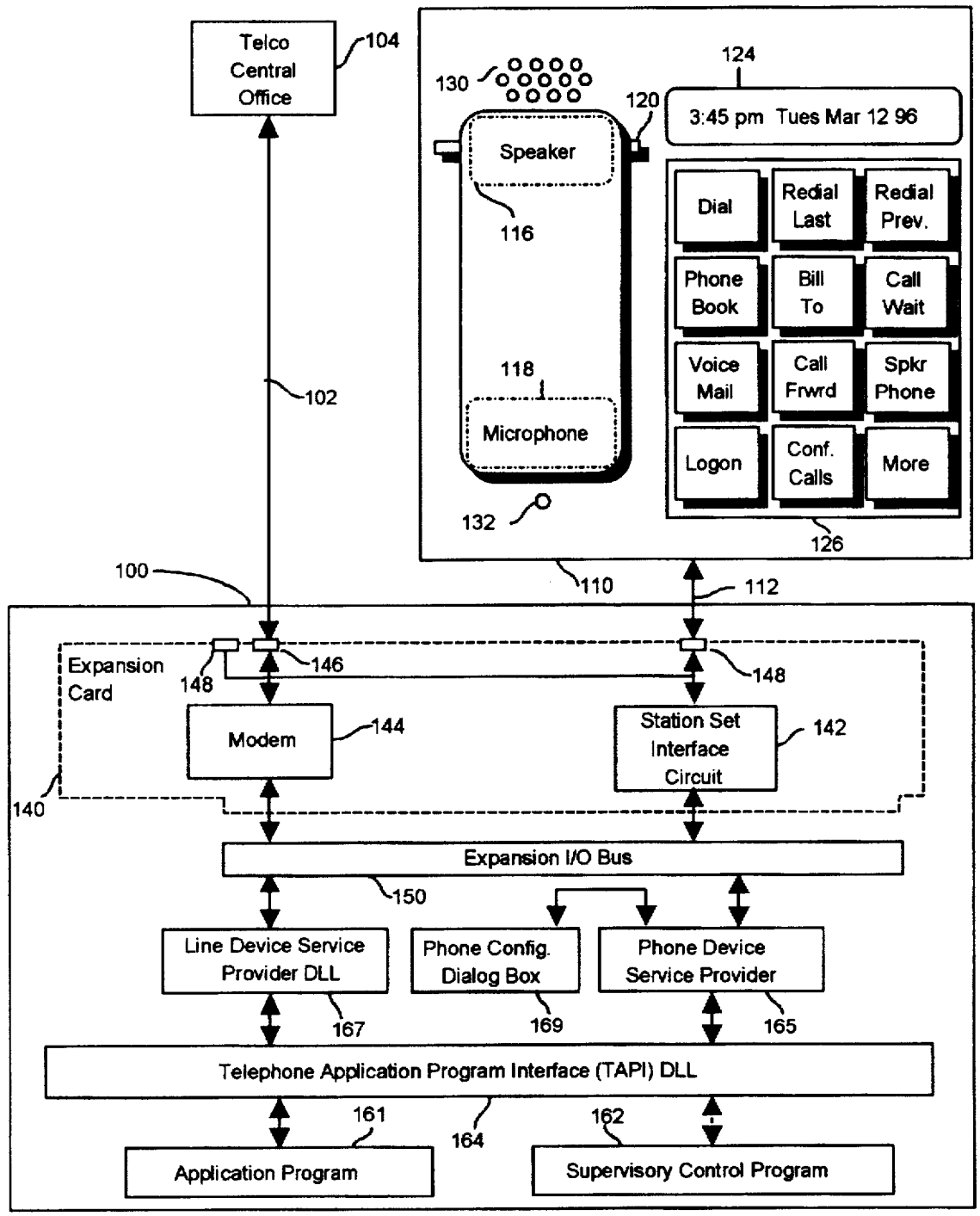
FIG. 1 is a block diagram illustrating the relationship between the principle components of the preferred embodiment of the invention.

FIG. 1 illustrates the relationship between the principal hardware and software components of the preferred embodiment of the invention. As seen in FIG. 1, a personal computer 100 is connected via telephone subscriber line 102 to a telephone service central office 104. Computer 100 is further connected to a phone device 110 by an interface connection 112.

The phone device 110 includes a handset 114 which houses an earpiece speaker 116 and a mouthpiece microphone 118. When not in use, the handset 114 rests on the housing of the phone device 110, engaging a hookswitch illustrated at 120 to place the phone device in an "ON HOOK" state in the conventional fashion. A liquid crystal display panel 124 and a keypad 126 are mounted on the exterior face of the phone device 110. The display 124 is capable of displaying up to twenty-four alphanumeric characters which are transferred as a character data stream to the phone device 110 via the interface connection 112.

The keypad 126 preferably comprises twelve display keys arranged in the conventional telephone keypad matrix consisting four rows with three keys per row. A key actuation signal is sent to the personal computer 100 via the interface connection 112 whenever any of the keys in the keypad 126 is pressed or released. Each key in the keypad 112 incorporates a backlit liquid crystal display (LCD) panel which is capable of displaying a graphical or alphanumeric image, the image being transferred to the key via the connection 112 as a block of pixel image data generated and transmitted by the computer 100. In addition, the backlighting of each key's LCD display panel is selectively controlled by backlight command signals supplied to the phone device 110 via connection 112 such that the backlighting may be turned OFF, or turned ON in a selected color (e.g. white, green or red).

The phone device 110 is further provided with a distinctive ringing device (not shown in FIG. 1), a loudspeaker indicated at 130, and a pickup microphone seen at 132. The loudspeaker 130 and microphone 132 permit the phone device 110 to operate as a speakerphone. Control commands sent from the computer 100 via connection 112 are employed to independently control the volume of sound delivered by the loudspeaker 130 and the volume of the sound produced by the earpiece speaker 116 in handset 114. Similarly, control commands sent via connection 112 independently control the gain of the pickup microphone 132 and the mouthpiece microphone 118.

Circuitry on a hardware expansion card 140 is used to establish communications between the computer 100 and the telephone line 102 and between the computer and the phone device 110 via the interface connection 112. The expansion card 140 plugs into a standard I/O system bus hardware interface slot seen at 150 to establish connections with the data, address and control lines of the personal computer 100. As discussed in more detail below, the embodiment of the invention described herein is adapted for use with personal computers typically employing the Intel 386, 486 and Pentium processor families capable of implementing the Windows 95 and Windows NT operating system distributed by Microsoft Corp. Accordingly, the expansion card 140 is preferably adapted to mate with and communicate with a system bus slot configured in accordance with the ISA or EISA (16 bit) or the PCI bus (32 bit) interface standard commonly used in computers of this class. Specifications and complete descriptions for each of these industry standard bus configurations may be found, for example, in Chapter 5, "Bus Slots and I/O Cards", *Upgrading and Repairing PCs*, 5th Edition, by Scott Meuller, Que Corp., Indianapolis, Ind. (1995), ISBN 0-7897-0321-1.

The expansion card 140 preferably includes a data/fax/voice modem unit 144 of conventional design. The modem unit 144 preferably provides modem data transmission at 28.8K bps employing the CCITT modem protocols V.34; V.Fast Class; V.32 terbo; V.42 bis; V.42; V.32 bis; V.32; V.22 bis; and V.22, supports the MNP 5 error correction/data compression protocols, and the Hayes AT command set for line control, including autodial support. The modem 144 additionally provides send/receive FAX modem document transmission at 14.4K bps using the CCITT Group 3 Fax protocol (V.17). Available internal expansion cards which provide such industry standard data/fax/voice capabilities over dialup telephone facilities are available commercially as exemplified by the *Courier V.Everything with V.34 PC modem* sold by U.S. Robotics Corp., 8100 N. McCormick Blvd., Skokie, Ill. 60076-2999 and the *Optima 288I V.34/V.FC+FAX modem* sold by Hayes Microcomputer Products, Inc., PO Box 105203, Atlanta, Ga. 30348, both of which are compatible with the 16 bit ISA I/O bus. The conventional data/voice/fax modem 144 typically includes a telephone line control mechanism for performing pulse and dial tone (DTMF) dialing, data compression and error correction, data transmission flow control and protocol support, transmission speed control, and transmission control.

As seen in FIG. 1, the modem unit is connected to the dialup telephone line 102 by a standard telephone jack 146 which is cross-connected with an auxiliary telephone jack 147 which permits other telephone station equipment to be connected to the telephone line 102. The interface connection 112 to the phone device 110 is connected to the expansion card 140 by means of a standard 25-line PC parallel port connection 148 which includes power, bidirectional data lines, control lines, and lines directly connected to the telephone lines 102. See Chapter 11, "Communications and Networking," *Upgrading and Repairing PCs*, cited above, for pin assignment specifications for the standard parallel port interface. The display keys in the keypad 126 receive display data via 8 bit parallel data output lines of the connection 112, and the 8 data input lines of the connection are used to pass key press signals from the phone device and to provide circuit paths for the telephone line circuit 102 (tip and ring lines) which are directly cross connected between the phone jack connectors 146 and 147 and the telephone circuit lines of the interface connection 112 at the 25 pin socket 148. This direct cross-connection allows to phone device to operate as a conventional telephone when the computer 100 is powered down. To this end, the phone device may advantageously be provided with a conventional auxiliary touch-tone keypad (not shown) in the handset 114 and an associated dial tone generation circuitry, permitting incoming calls to be dialed manually at the handset, even when the computer 100 is inoperative. Alternatively, the display key switches in keypad 126 may be interconnected with a dial tone generator for generating dial tones when the computer 100 is powered down and unable to produced dialing signals using the modem 144. Similarly, the phone device 110 includes a ringing circuit (not shown) for providing audible ringing in response to the appearance of ringing signals on the telephone line circuit 102 when the computer 100 is inoperative and, as discussed later, for providing ringing signals at the phone device in response to ringing commands from the computer 100.

Software

The personal computer 100 includes a conventional mass storage subsystem (not shown), typically a magnetic "hard" drive, which provides persistent storage for program files which are loaded into the computer's random access memory for execution by the processor. These program files are loaded by the operating system to form concurrently resident, interactive modules illustrated in block diagram form in FIG. 1. These modules include:

a supervisory control program seen at 162 which functions as an application program automatically loaded during system startup and thereafter continuously resident as an active, although typically dormant, process as long as the computer 100 is powered up in order to support the operation of the phone device 110;

- a telephone application program interface library 164, such as the TAPI dynamic link library (DLL) which forms part of the Windows 95 operating system marketed by Microsoft Corp., Redmond, Wash.;
- a phone device service provider dynamic link library 166 which operates as a hardware device driver providing interface routines which provide communications between the phone set hardware interface circuit 142 and the TAPI DLL 164;
- a line device service provider dynamic link library 167 such as the UniModem SPI included as part of Windows 95 which provides a device driver interface between the data/voice/fax modem 144 and the line device service provider interface (Line Device SPI) 168 defined by the TAPI DLL 164;
- a configuration dialog box routine 169 which may be invoked by the phone device SPI DLL 165 when the supervisory control program or any other running application program such as application program 170 requests the user to provide configuration information by making passing a request for the configuration dialog box via the TAPI DLL 164 and the phone device service provider 165; and
- one or more additional application programs illustrated by the program 170 which offers telephone management services utilizing the services provided by the TAPI DLL.

The supervisory control program 162 preferably communicates with the modem 144 and with the phone device interface circuit 140 using a standard interface protocol such as the *Telephony Application Program Interface* (TAPI) jointly developed by Microsoft Corp. and Intel Corp. Alternatively, the *Telephony Services Application Program Interface* (TSAPI) promulgated by Novell, Inc. and others may be similarly employed to provide substantially the same functionality. The embodiment of the invention, as described in more detail below, employs the TAPI interface implemented in Microsoft's Windows 95 operating environment and described in detail in the *Microsoft WIN32 System Development Kit* (SDK), "Telephony Application Programming Interface (TAPI)", published as part of the *Microsoft Development Library* by Microsoft Corp., Redmond, Wash.

The supervisory control program 162 takes the form of a WIN32 application program which functions in accordance with the software design specifications set forth in the *Microsoft Win32 Programmer's Reference* (1995), published by Microsoft Corp., which fully describes the elements of the Win32 application programming interface (API), including functions and related data types, macros, structures, and messages. The *Win32 Programmer's Reference* is the definitive source for specific information defining the makeup of Win32-based applications.

As described in more detail below in connection with FIG. 2, supervisory control program 162 controls the operation of the modem 144 and the phone device 110 by responding to Windows messages relating to telephone management operations, by making function calls to the TAPI.DLL 164 which forms part of the Windows 95 operating system, and by incorporating callback functions which respond to function calls from the TAPI.DLL 164. The *Win32 Telephony (TAPI) Programmer's Reference* (1995), published by Microsoft. Corp., defines the Microsoft Windows Telephony application programming interface (API) which provides services that enable an application developer to add telephone communications to applications developed for the Microsoft Win32 (API). Additional information, including example programs illustrating the mechanism used by application programs to implement telephone functions using TAPI are described in the article "Tapping into TAPI", by Nancy Winnick Cluts, *Microsoft Developer Network News*, Vol 4. No. 6 (November–December 1995); "Creating a TAPI Connection Using CtapiConnection," by Nancy Winnick Cluts, *Microsoft Developer Network News*, Vol 5. No. 1 (January 1996); and "Developing Applications Using the Windows Telephony API," by Toby Nixon, *MSDN Conferences/Tech\*Ed 1994/Microsoft At Work* (1994).

The supervisory control program 162 is preferably loaded at system startup time when the Windows 95 operating system is initialized. As is in all Windows 95 application programs, the supervisory control program 162 and includes, in its main routine, message loop which repetitively calls the WIN32 function GetMessage. The control program 162 operates in background and its sole purpose is to execute code in response to window messages posted to the program thread's message queue. If there are no pending messages, the operating system puts the thread to sleep and no longer schedules CPU time to the thread. When a message appears in the thread's message queue, the system wakes up the thread. GetMessage copies the message from the queue into the &msg variable and Windows then executes the function DispatchMessage to pass the message data to the window procedure of the control program 162.

The mechanism used by TAPI to notify applications of events is based on function callbacks, and TAPI defines the parameter profile for these callbacks. When an event occurs, the application's callback function is invoked from within the application's thread (at the time the application calls the GetMessage function), providing a normal, fully functional execution environment in which all Windows APIs can be safely invoked. To perform operations which must be handled asynchronously, TAPI provides a reply callback mechanism. The reply callback made to the application carries the request ID and an error indication. Valid error indications for this reply are identical to those that are returned synchronously for the associated request, or zero for success. Only the application that issued the request will receive the reply callback, but when the request causes changes in the state of the device or call, other interested applications may also receive event-related messages. TAPI guarantees that a reply callback is made for every request that operates asynchronously, and it defines which functions are notified synchronously and which are notified asynchronously.

Messages transmitted to the application from TAPI utilize the application-supplied callback function, lineCallbackFunc, in the application's context. When an application makes the TAPI function call lineInitialize or phoneInitialize, it specifies a callback function by passing its pointer as a parameter. The callback message always contains a handle to the relevant object (phone, line, or call). The parameter profile for callbacks contains a multi-purpose handle parameter which is used for passing a handle to the relevant phone, line, or call. The callback function can determine the type of the handle from the message that was passed to the callback. Certain messages are used to notify the application about a change in an object's status. These messages provide the object handle and give an indication of which status item has changed. The application can call the appropriate "get status" function of the object to obtain the object's full status.

Messages from TAPI which represent line device events (events characterizing the status and functioning of the modem 144 and the telephone line 102) are produced by the UniModem line device service provider 167. Similarly, phone device events characterizing the status and functioning of the phone device 110 are produced by the phone device service provider 140. Both of these service providers operate as device drivers which support the TAPI SPI for communication of hardware events and signals to the TAPI DLL via the TAPI line device SPI and the TAPI phone device SPI. Detailed information on the structure and operation of Windows 95 device drivers generally is contained in *The Device Driver Programmer's Reference*, Microsoft Corp. (1995) which details the structure and operation of Windows-based device drivers for use with Microsoft Windows 95. Microsoft *Windows 95 Device Driver Development Kit*, Microsoft Corp. (1995), provides additional detail and examples used to implement device drivers generally, and specific information on the makeup of line device driver routines suitable for interfacing a robust voice/data/fax modem with the TAPI SPI may be found in the *Windows 95 Modem Development Kit (MDK)*, Microsoft Corp. (1995), which provides the tools, sample INF files, and information needed to build and test the Windows 95 format INF files for AT (data) and AT+V (voice) command modems. Windows 95 INF files are required for modems to be used by programs which call the Windows Telephony API (TAPI) to make data/fax/voice calls, including the Windows 95 applets HyperTerminal, Dial-up Networking, Phone Dialer, and other Win32 communications applications written for Windows 95.

The preferred embodiment of the invention seen in FIG. 1, as noted above, may employ a commercially available data/voice/fax modem 140 as well as a conventional line device service provider DLL 167. It should be understood however that the TAPI line services may be provided by other conventional means, such as a high speed ISDN connection, a network interface to a shared modem or PBX, and the like, in ways that are essentially transparent to the operation of the phone device 110 and the supervisory control program 162. The line device service provider 167 may accordingly take the form the universal modem driver (UniModem) supplied as part of Windows 95, an operating system layer that cooperates with TAPI to provide services for data and fax modems and voice so that users and application developers need not deal with difficult modem AT commands to dial, answer, and configure modems. Rather, UniModem does these tasks automatically by using mini-drivers written by modem hardware vendors and made available, for most modems, as a part of Windows 95 or supplied separately by the modem vendor. UniModem is both a VCOMM device driver (supporting DOS legacy programs) and a TAPI service provider. Other service providers (for example, those supporting other devices, such as an ISDN adapter, a telephone on a PBX system, or an AT-command modem) can also be used with TAPI and thereby made available for use by the phone device 110.

The phone device service provider 165 similarly operates as a WIN32 device driver but performs a more limited set of functions in support of the TAPI phone device interface built in functions and protocols for handling all of the following elements:

Hookswitch/Transducer. The Windows 95 Telephony API recognizes that a phone device may have several transducers, which can be activated and deactivated (taken offhook or placed onhook) under the control of an application (e.g. the supervisory control program 162) or manual user control. TAPI handles the two types of hookswitch devices present in the phone device 110: the handset 114, a traditional mouth-and-ear piece combination that must be manually lifted from the hookswitch 120 and held against the user's ear, and the speakerphone formed by the combination of loadspeaker 130 and pickup microphone 132, enabling the user to conduct calls hands-free. The hookswitch state of the phone device 110's speakerphone can be changed both manually and by the supervisory control program 162 in response to the depressing of display keys in the phoneset.

Volume Control/Gain Control/Mute. Each hookswitch device is the pairing of a speaker and a microphone component. The TAPI API provides for volume control and muting of speaker components and for gain control or muting of microphone components.

Ringer. A means for alerting users, usually through a bell. The phone device 110 preferably includes a ringing annunciator which rings in a variety of modes or patterns to provide distinctive ringing determined by commands from the control program 162 and transmitted via TAPI to the ringing circuitry in the phone device 110.

Display. The LCD display panel 134 seen in FIG. 1 for visually presenting messages to the user is supported by the TAPI display functions. A TAPI compliant phone display is characterized by its number of rows and columns. In the illustrative embodiment described here, the display consists of a single LCD panel 124 for displaying a single, 24 character alphanumeric string passed via the TAPI display interface from the control program 162.

Buttons and lamps. The TAPI button interface is used to support the array of twelve backlit display keys in the keypad 126. Whenever the user presses a button on the keypad 126, TAPI reports that the corresponding button was pressed to the application program (e.g. the supervisory control program 162). TAPI button-lamp IDs identify a button and lamp pair. The white backlighting source in each button is treated as the lamp associated with the associated physical keypad button which to form one such TAPI "pair." TAPI also accommodates button-lamp pairs with either no button or no lamp, and hence two sets of twelve "buttonless" pairs are used to handle the green and red backlighting sources for the display keys. The backlighting lamps are hence individually controllable from the API and can be lit in different modes by independently varying the on and off frequency of each of the three backlight lamp colors (white, red and green) to provide Off, flashing, flickering or flash-flickering modes for each. This mode and color control enables special visual effects to be employed to direct the user's attention to special features and functions. Each lamp, color and mode can be independently set using the TAPI button-lamp ID to identify the lamp being controlled.

Data Areas. TAPI further accommodates the loading of addressable memory areas in the phone device. Normally used in TAPI environments for storing phone device instruction code or data that can be downloaded to and/or uploaded from the phone device, the present invention also utilizes this TAPI data movement mechanism to transmit the individual display key bitmaps from the control program 162 to the display keys in keypad 126 as described in more detail below.

In addition to the utilization of TAPI as noted above for the communication of control commands from the application program (e.g. control program 162) to the phone device 110, TAPI is also used to transmit information concerning the actuation of keys on the keypad to the application program. When a button is pressed, a PHONE_BUTTON message is sent to the application's callback function. The parameters of this message are a handle to the phone device and the button-lamp ID of the button that was pressed. The keypad buttons (normally labeled '0' through '9', '*', and '#') are assigned the fixed button+white lamp IDs 0 through 11. These button messages indicate when a button is pressed and when it is released, enabling the supervisory control program to maintain a software status indication for each button, permitting the control program to recognize and respond to two or more buttons to be pressed simultaneously to create special effects, in the same way that simultaneous key presses on a computer keyboard may be assigned special significance.

Figure 2:
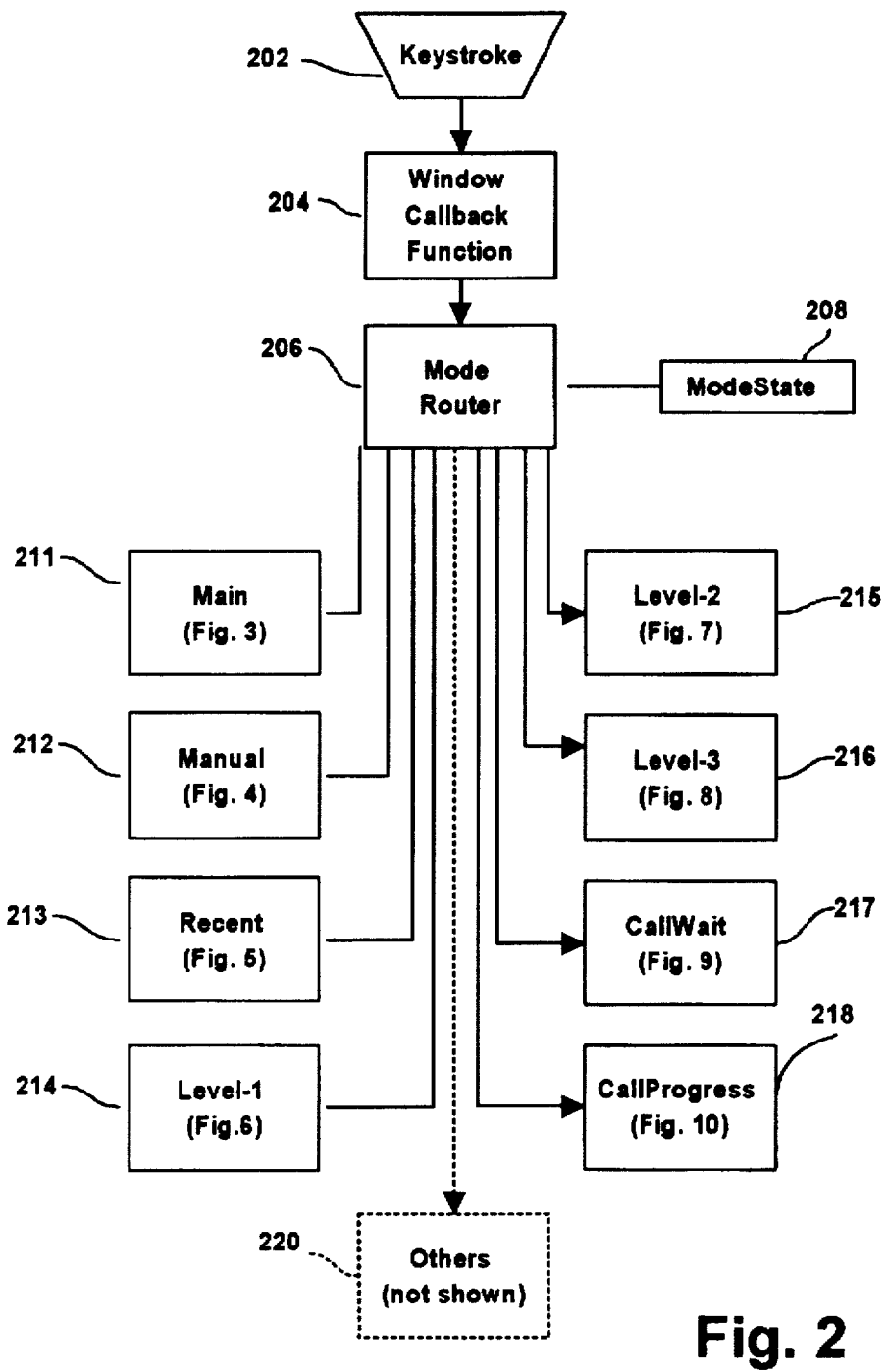
FIG. 2 is a control flow diagram illustrating the manner in which key press operations are processed by the supervisory control program used to implement the invention.

The supervisory control program 162 responds to each key press operation as illustrated in FIG. 2. Each keystroke operation performed by the user using the keypad 126, indicated at 202 in FIG. 2, sends a PHONE_BUTTON message to the callback function 204 of program 162. The callback function 204 evaluates the incoming message, setting that switch status variable associated with the button ID identified in the incoming message to a value determined by whether the message indicates that the button has been pressed or released. Messages indicating that a button have been pressed are then passed to message routing function 206 which calls a particular message handling function in accordance with the current value of the modestate variable stored at 208.

The modestate variable 208 contains one of a predetermined set of ordinal values each of which indicates a particular machine state. A message handling function is associated with each state. FIG. 2 shows eight such functions, by way of illustration, at 211–218. Each mode function 211–218 interprets and responds to the keypress signals from keypad 126 when the machine state is in a particular mode. Thus, when the modestate variable is in MAIN mode, each incoming PUSH-BUTTON message is routed to the MAIN message handling function 211; when the modestate is MANUAL, the routing function passes the PHONE_BUTTON message as a parameter to the MANUAL message handling function 212, and so on.

Figure 3:
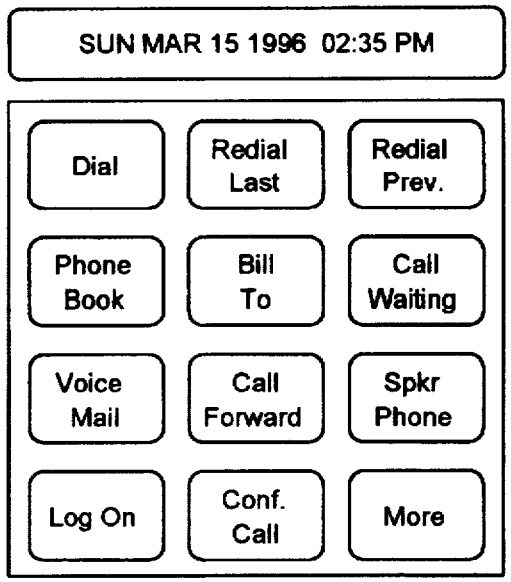
FIGS. 3–10 illustrate eight keypad displays utilized in connection with eight corresponding mode states of the phone device.
Figure 4:
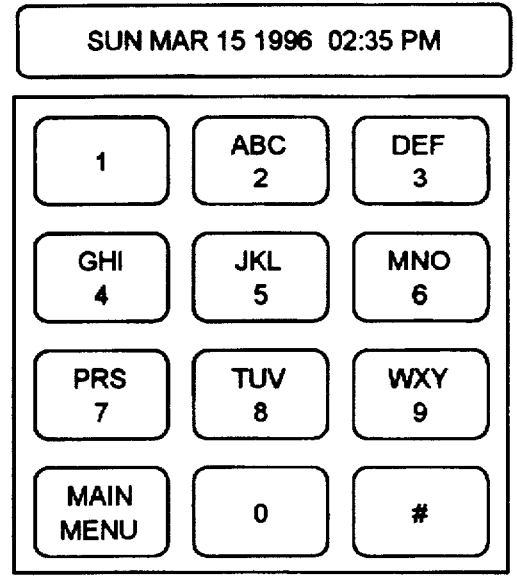
Figure 5:
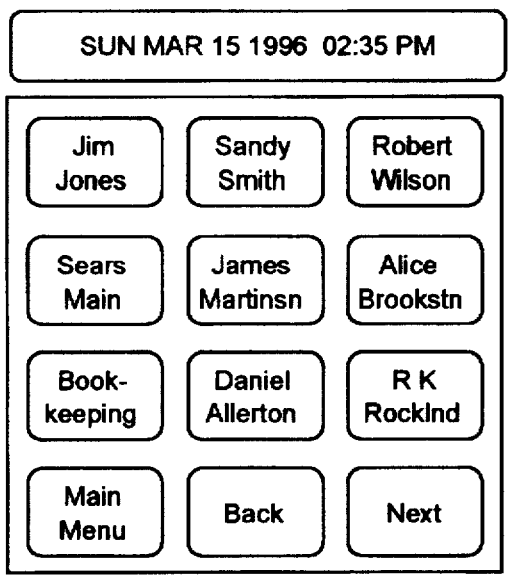
Figure 6:
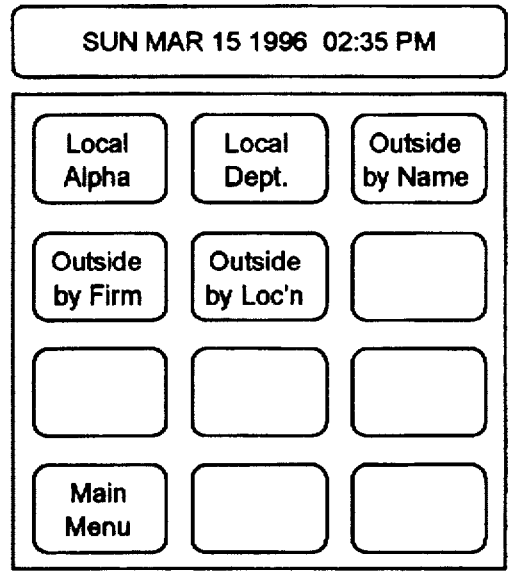
Figure 7:
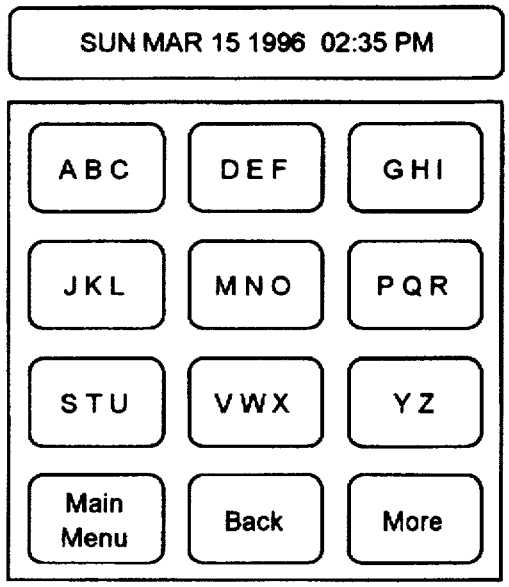
Figure 8:
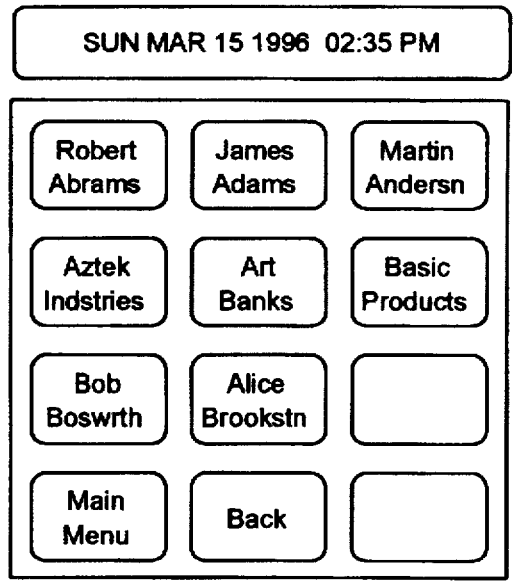
Figure 9:
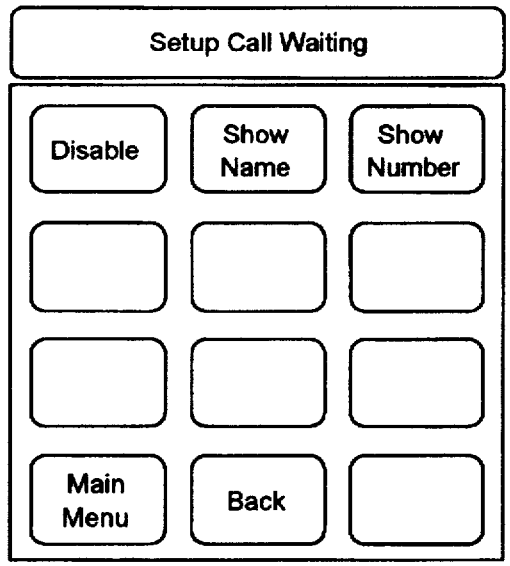
Figure 10:
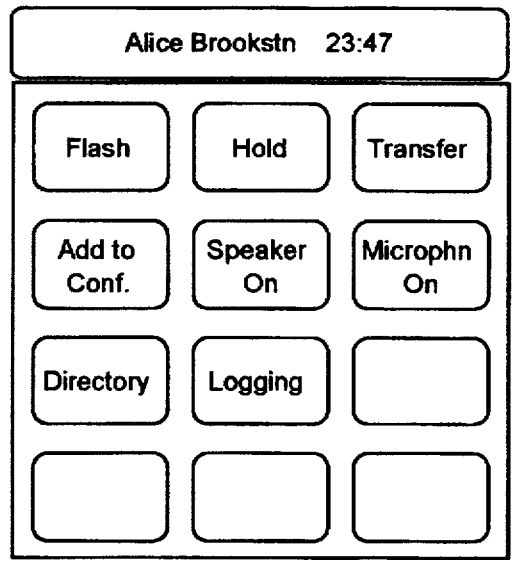

In many cases, a message handling function will respond to a particular button press by switching mode states. Mode state changes are accomplished by (1) setting the modestate variable 208 to a new value, thereby changing the routing of incoming messages; (2) sending a new set of button graphics displays and backlight lamp settings to the keypad 126; and (3) sending a new alphanumeric string for display by the LCD panel 124. Illustrative button and LCD displays are shown in FIGS. 3–10 of the drawings which show the button graphics and alphanumeric displays used for each of the eight illustrative modestates and their corresponding message handling functions as set forth in the table below:

| Button Display | ModeState Description | Message Handler |
|---|---|---|
| FIG. 3 | Main (idle state) | 211 |
| FIG. 4 | Manual Dialing | 212 |
| FIG. 5 | Recently Called Parties | 213 |
| FIG. 6 | Directory Level 1 | 214 |
| FIG. 7 | Directory Level 2 | 215 |
| FIG. 8 | Directory Level 3 | 216 |
| FIG. 9 | Call Waiting Setup | 217 |
| FIG. 10 | Call in Progress | 218 |

When the supervisory program is initialized it places the phone device in the MAIN ModeState. Moreover, if the system is idle, as indicated by a predetermined elapsed time with no key press activity, the supervisory program 162 automatically returns the phone device to the MAIN (idle) ModeState.

Each time the supervisory program places the phone device into any new ModeState, it performs at least the following actions:

(1) the ModeState variable is set to a new value indicating the new mode state such that, thereafter, all PHONE_BUTTON messages will be routed to the appropriate modestate message handling routine 211–220.

(2) a new alphanumeric string is transmitted to the display 124 seen in FIG. 1. TAPI provides access to a phone's display which is rewritten using the function call phoneSetDisplay to write information to the display 124 of the open phone device 110.

(3) a new set of twelve bitmaps is sent to the twelve key displays in the keypad 124. The Telephony API models a phone device as having one or more download or upload areas. Each area is identified by a number that ranges from zero to the number of data areas available on the phone minus one. Sizes of each area may vary and he format of the data itself is device-specific. In the illustrative embodiment, twelve download areas are reserved for monochromatic bit maps, with each bit indicating whether a given pixel is ON or OFF. Key display resolutions of 32×16 (512) bits provide sufficient resolution to provide meaningful function identifications, however more descriptive information, such as the names of parties to be called which are displayed in a speed dialing directory as discussed later, can be provided using a larger bitmap. In the examples that follow, a 64×64 bit display is assumed, requiring that a 4096 bit (512 byte) TAPI download area be designated. The TAPI phoneSetData function downloads a buffer of data to a given data area in the phone device. The twelve bitmaps for each modestate are stored in two dimensional array indexed by the modestate value and the button number 0–11. When a new modestate is entered, the supervisory control program calls phoneSetData twelve times to pass the bitmaps for the twelve keys associated with the new modestate to the keypad 126.

(4) The backlighting of each key is also reset whenever a new modestate is entered using the TAPI phoneSetLamp, which lights a lamp on a specified open phone device in a given lamp lighting mode. TAPI supports the following lamp mode specifications:

PHONELAMPMODE_OFF—the lamp is off.;

PHONELAMPMODE_STEADY—the lamp is continuously lit.;

PHONELAMPMODE_FLASH—"Flash" means slow on and off;

PHONELAMPMODE_FLUTTER—"Flutter" means fast on and off;

PHONELAMPMODE_BROKENFLUTTER—"Broken flutter" is the superposition of flash and flutter; and PHONELAMPMODE_WINK—the lamp is winking.

FIG. 3 shows the bitmap displays presented in an illustrative MAIN (idle) mode. In FIGS. 3-10, the alphanumeric display presented by the LCD display 124 is shown immediately above the 12 key bitmap displays. In the MAIN modestate, the LCD display shows the current date and current time of day which is updated every minute by a timer routine in the supervisory control program which obtains the date and time from the system, constructs and formats the display string, and sends the resulting string to the display using the TAPI function call phoneSetDisplay.

In the MAIN modestate, the twelve buttons on the keypad display the bitmaps illustrated in FIG. 3 and all PHONE_ BUTTON messages received from TAPI are routed to the MAIN routine seen at 211, which operates as follows when the respective button numbers 0 through 11, are identified:

Button 0 pressed: Manual dialing is request ed the system is placed in the MANUAL modestate, resulting in the display seen in FIG. 4 being displayed and all PHONE_ BUTTON messages thereafter being processed by the MANUAL message handler 212;

Button 1 pressed: The user requests that the most recently dialed number be redialed. Each dialed number is saved by the supervisory control program is saved in a dialable phone address string variable LAST_DIALED which is passed to TAPI using a lineMakeCall or LineDial function call. The modestate is then switch ed to the INPROGRESS mode (FIG. 10) and the display 124 is sent a string containing the concatenated combination of "Dialing" and the LAST_ DIALED string variable to overwrite the default display message created when the INPROGRESS mode was entered.

Button 2 pressed: The user requests a display of the most recently dialed numbers, which is accomplished by entering the PREVIOUS modestate whose display is illustrated in FIG. 5. As calls are established, they are stored in a most-recently-used stack in a persistently stored database by the supervisory control program 162 with the nine most recent called parties being displayed as shown in FIG. 3. One of the most useful features of the invention is its ability to visually associate the identification of a callable party with a key. As illustrated by FIGS. 3 and five, the task of redialing a selected one of the nine most recently called numbers involves only two keypresses, first pressing the key labeled "Redial Prev." which then displays the nine most recently called parties on keys, and then pressing the key for the desired party, without any need to touch a computer keyboard, start a particular telephone management program, or manipulate window objects with a mouse. No computer skills are required and small children can readily understand and use the system in a completely familiar and intuitive way.

Button 3 pressed: The user requests access to a multi-level phone book which takes the form of a conventional relational database (not shown), persistently stored in the computer 100 and accessed by the control program 162. Pressing Button 2 labeled "Phone Book" sets the modestate to LEVEL_1 to create the display seen in FIG. 6 and route ensuing PHONE_BUTTON messages to the Level-1 message handling routine 214. In the LEVEL_1 mode, the user can select between a variety of subdirectories, illustrated in FIG. 6 as consisting of button selectable sub-directories of (1) local numbers within a business establishment arranged alphabetically, (2) the same local numbers organized by work group, (3) outside phone numbers organized alphabetically by the last name of the callable person, (4) outside number organized alphabetically by firm name, (5) outside phone numbers organized alphabetically by geographical location. When a button is pushed to select a subdirectory organized which is organized alphabetically, the control program 162 first executes a subroutine which consists of sending a keypad display of the type seen in FIG. 7 to the keypad to obtain a selection from the user identifying an alphabetic subsection of the phone book database directory. As an example, if the user wishes to call a person outside the organization named "Alice Brookstone", the "Phone Book" key would be pressed first in the MAIN modestate presenting the display of FIG. 6. Then, the user would press the button marked "Outside be Name" to produce the display of FIG. 7. Next, the button marked "ABC" would be pressed to produce an listing of callable parties displayed alphabetically by last name, as illustrated in FIG. 8, which includes a button bearing the display "Alice Brookstn" (shortened to fit into the 64×64 bit display). Pushing that button would place the call to her phone number in the manner indicated earlier and further place her identification in the stack of recently called parties as well as in the LAST_DIALED variable discussed earlier to make her name and number available using the MAIN mode "Redial Last" and "Redial Prev." buttons.

Button 4. By pressing the "Bill To" button in the MAIN modestate, the user can use a database lookup function similar to the phonebook lookup procedure indicated above to identify a particular billing account to which future calls should be billed. When button 4 is pressed in MAIN mode, the phone device is reset to the BILLTO modestate and a lettercode grouping display as shown in FIG. 7 is shown on the keypad, except that the LCD display shows the current account selected with a display such as "Bill To Ajax. Corp." If the user determines that the current setting is correct, the "Main Menu" or "Back" keys can be pressed to return the system to the MAIN modestate. Note that, to provide a consistent interface to the user, three functions always appear in the same positions on the keypad: "MAIN MENU" (for resetting the system to its MAIN modestate), "BACK" (for returning the system to the modestate that called the present state, which may or may not be the MAIN modestate), and "NEXT" for calling a modestate which is, in effect, contains additional options and forms, in effect, an extension of the present state). In the case of lookup functions such as those implementing the "phone book" and "bill to" selections, the "NEXT" key operates to continuously step through a given directory level, nine items at a time, returning to the first items when the end of the directory level is reached. To implement the accounting functions, the supervisory control program appends a record to an accounting file each time a call is completed, recording the identity of the party with whom the communication took place, the starting and ending time of the call (from which its duration may be determined for billing purposes), and the identification of the account (selected using the Bill To key sequence described above) to classify the call. Actual billing reports are then produced at any time by reading the data stored in the accumulated accounting file.

As illustrated by the foregoing examples, the present invention permits substantially any telephone management function to be activated by an inexperience user by simply pressing buttons labeled to indicated the desired functions. As illustrated in the display seen in FIG. 3, these functions may additionally include call waiting setup controls, voice mail, call forwarding control, speakerphone activation and control, database logon functions, and more.

In addition, as illustrated in FIG. 8, the display keypad and LCD may be used to control the handling of a call in progress when the system is in the INPROCESS modestate.

Pressing the "Flash" button seen in FIG. 8 causes the CallProgress message handler 218 to terminate the present connection by calling the TAPI function lineDrop to obtain a new dialtone and reset the system to its MAIN modestate to permit a new call to be initiated. Pressing the "Hold" button suspends the present call without loosing the connection and, if additional lines are available through, allows another conversation to proceed concurrently.

Note that the capabilities of the TAPI DLL included with the operating system permit a plurality of different lines to be active simultaneously and allow a give phone device to be programmatically "connected" with an such logical line. Similarly, the display keypad control mechanism contemplated by the invention may be used to particular advantages to control "Supplementary Services which are defined by the Telephone SPI, but not included in the basic telephony subset. These services include all so-called supplementary features found on modern PBXs including hold, transfer, conference, park, etc. Depending on the capabilities of the line device services which are connected in a given setting, the present invention can control these services through the TAPI DLL, and can query a line or phone device for the set of supplementary services it provides. Note that a single supplementary service may consist of multiple function calls and messages."

Finally, as illustrated by the use of the keypad for controlling speaker volume and microphone gain, and the control information displayed by the LCD panel 124, any of the instrumentalities within a phone device can also be controlled by sending button messages from the display keypad through TAPI to the control program and sending control commands from the control program via TAPI to the phone device. As discussed below in connection with FIG. 11, the phone device itself may contain a programmable microcontroller for controlling the operations of the phone set, and the TAPI interface is commonly used to download specific instructions and commands from the computer to the phone device to implement specific phone device functions. It is important to recognize, however, that the phone device contemplated by the invention provides its own user interface, even though it may call upon the processing service of the connected computer. The phone device of the present invention is designed to mimic the operation of a conventional telephone set during normal operation, as well as to retain all the functionality of a conventional telephone set in the event of a power outage or the failure of a component in, or controlling, the LCD keypad.

Although the supervisory control program operates in the background, requires no attention from the user, and does not require a user interface window on the display screen of the computer 100, a configuration dialog box, callable by the phone device service provider 165 provides a mechanism for obtaining information from the user and displaying information to the user by way of the computer 100. Just as the TAPI API function lineConfigDialog allows a running application program to request the invocation of a dialog box (not shown) supplied with the line service provider DLL, such as UniModem, the TAPI function phoneConfigDialog causes the phone device service provider 165 to display a dialog box (attached to hwndOwner of the calling application) to allow the user to view and configure parameters related to the phone device. The phone device dialog box seen at 169 may be called from the computer 100 in response to a request from the supervisory control program when the user uses the mouse to "right click" on the service providers' minimized icon in the usual fashion to display a popup menu which includes a "Configure" option. Alternatively, a display key on the phone set may display the prompt "Config." in a suitable modestate, and the supervisory program can then respond to the actuation of that key by invoking the phoneConfigDialog TAPI function.

The configuration dialog box 169 may be advantageously employed to display bitmap, directory and billing database maintenance routines, provide a mechanism for identifying and incorporating graphic bitmap files with text to form the downloadable bitmaps for each key in each modestate, and so on. In this way, the functions of the phone device may be programmably configured from either the supervisory control program or from any other telephone management program (illustrated in FIG. 1 by the application program 170) which includes a mechanism for calling the phoneConfigDialog function which may be supported by any TAPI compliant application program. In this way, application programs which were not designed to support the functionality associated with the display keypad 126 may nonetheless configure the phone device 110.

Figure 11:
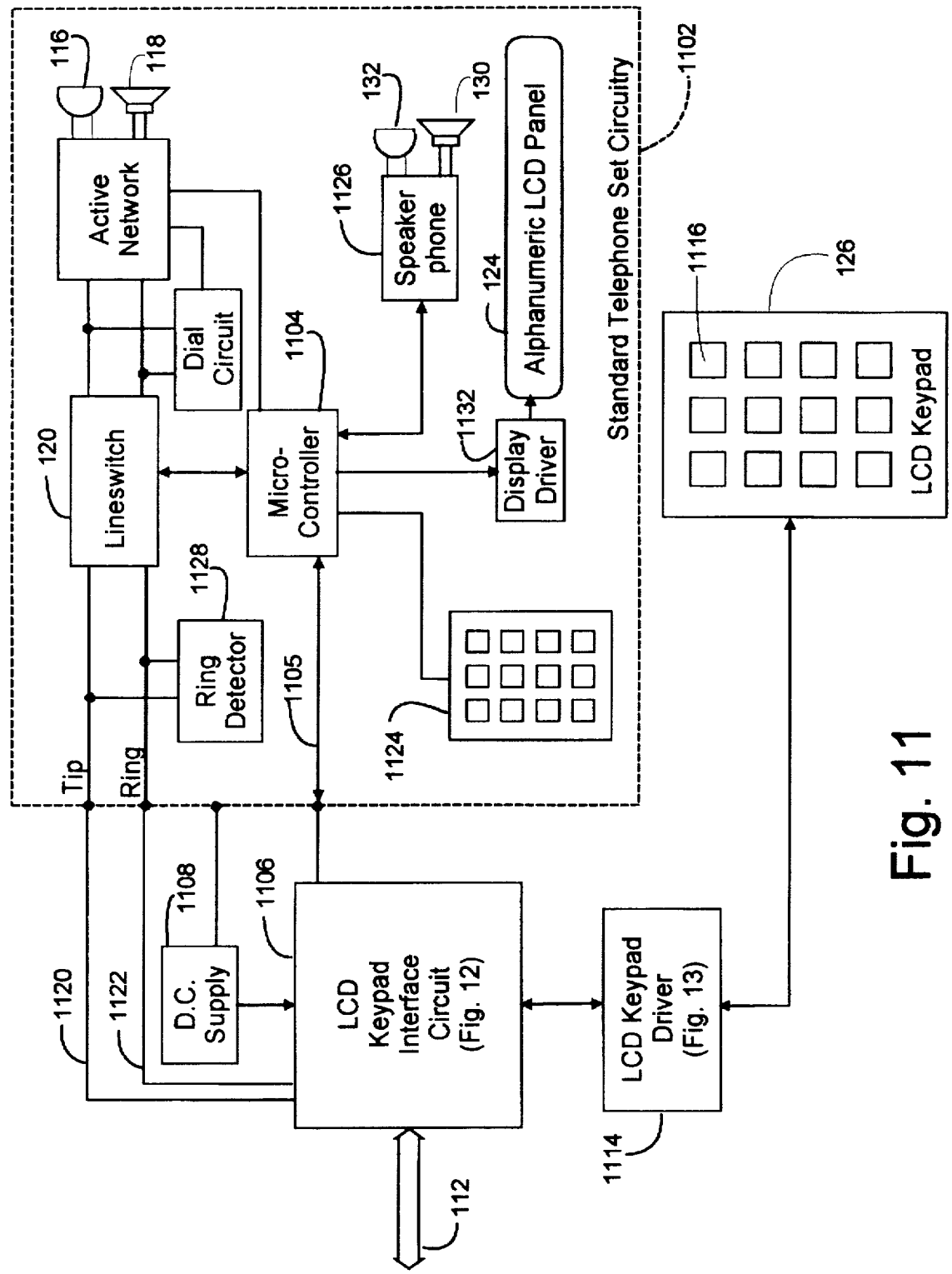
FIG. 11 is a logical block diagram of the phone device used to implement the invention.

FIG. 11 is a logical block diagram showing the preferred embodiment of the phone device, which was shown in block form at 110 in FIG. 1, in more detail. The phone device includes standard multifunction electronic telephone circuitry 1102 which is controlled by its own microcontroller 1104 additionally connected via control lines 1105 to an LCD keypad interface circuit 1106. Powered by a DC power source 1108, the LCD keypad interface circuit 1106 (shown in more detail in FIG. 12) is connected via the 25-line parallel interface connector 112 to the expansion card 140 in the computer 100. The LCD keypad interface circuit 1106 is also connected via LCD driver circuit 1114 (shown in more detail in FIG. 13) to receive button actuation signals from, and send display bitmaps to, the set of twelve LCD keyswitches 1116, arranged in the familiar touch-tone telephone set up of four rows-by-three columns, on the LCD keypad 126.

The multifunction, electronic telephone set circuitry 1102 is conventional and is described, for example, in *The Electronics Engineers Handbook*, 3rd ed., by Fink, Donald G. and Christiansen, Donald, eds. (1989) at pp.22-85–22-86. The telephone set 1102 operates under the control of a dedicated microcontroller as indicated at 1104. Although the preferred embodiment of the present invention utilizes an electronic telephone set as shown in FIG. 11, standard common-battery telephone set circuitry may also be used. The tip and ring telephone lines 1120 and 1122 are connected to the connected dialup telephone network by means of two data input lines in the interface connection 112 to the computer 100.

The microcomputer 1104 in the telephone set 1102 receives information from various functional circuits, such as the conventional touch-tone keypad 1124 which is preferably mounted in the handset 114 seen in FIG. 1 as noted earlier, and responds to this information by controlling other circuits, such as the speakerphone 1126. In the present invention, control instructions may be additionally be downloaded from the computer 100 under the control of the supervisory control program 162 using the TAPI data upload and download commands, permitting the microcontroller 1104 to be programmed in a variety of ways. The TAPI SPI models these phone sets as having one or more download and/or upload areas. Each area is identified by a number that ranges from zero to the number of data areas available on the phone minus one. Sizes of each area may vary and the format of the data itself is device specific to the particular phone set microcontroller. These phone set function download areas are identified by numbers distinct from the area identifiers used to designate the key display bitmaps. The TAPI function TSPI_phoneSetData downloads a buffer of data to a given data area in the phone device RAM which may advantageously be implemented as non-volatile memory so that the phone set, once initialized to perform particular functions, need not be reprogrammed when power is interrupted. Status data and other information may be uploaded from the microcontroller 1102 using the TAPI TSPI_phoneGetData function which uploads the contents of a given data area in the phone device to a designated buffer area in the process space of the running application program using the TAPI interface. When a data area of a phone device is changed, a PHONE_STATUS message is sent to the TAPI DLL's callback to notify the TAPI DLL about the state change. Parameters to this message provide an indication of the change.

Figure 12:
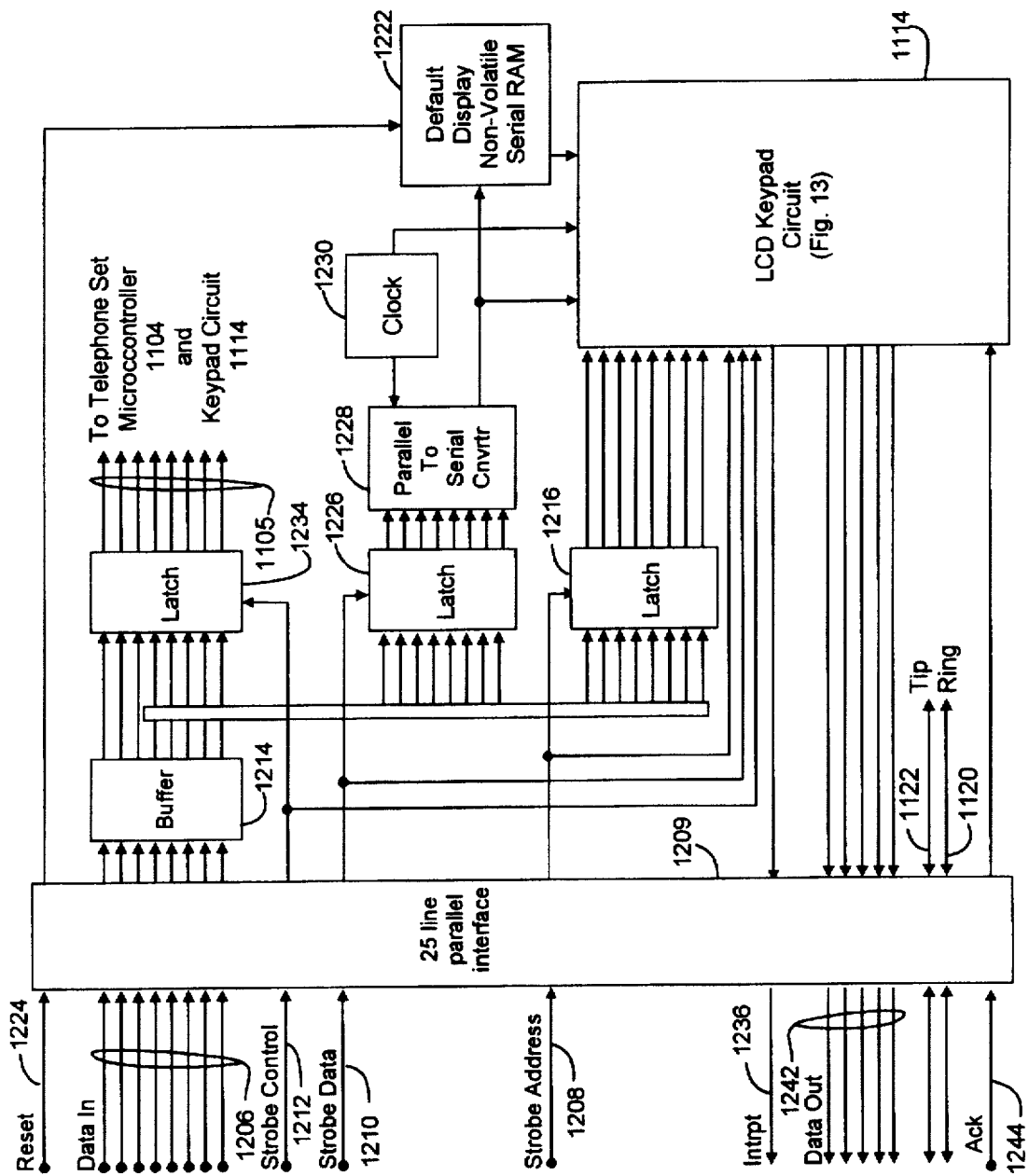
FIG. 12 is a block diagram of one embodiment of the interface circuit utilized in the phone device of FIG. 11.

An illustrative embodiment of the LCD keypad interface circuit 1106 is shown in detail in FIG. 12 and represents an adaptation of the LCD relegendable keypad interface shown in published PCT Application No. WO 95/12843, assigned to Feltscope Limited. The interface circuit 1106 is connected to the 25-line interface connection 112 to the computer 100 seen in FIG. 1 via a standard 25 pin connector 1209 which connects to a standard 25-line interface cable seen at 112 in FIGS. 1 and 11.

Information is transmitted to the phone device 110 from the computer 100 via the 8 data input lines 1206. A buffer 1214 connects the input lines to the inputs of three data latches which receive data under the control of three strobe input lines: the address strobeline 1208, the data strobeline 1210, and the control strobeline 1212. The content of the data on the input data lines 1206 differs depending on which strobeline is activated.

Data is received, eight bits at a time, from computer 100 via the eight data lines 1206 and is placed in parallel into a buffer 1214. If the address strobeline 1208 is activated, the data on input lines 1206 placed in latch 1216 designates a particular data transfer destination for keypad 126 and identifies one of the following: 12 bitmaps destinations, 12 white lamp modes, 12 red lamp modes, and twelve green lamp modes pairs. The presence of a bitmap destination indicates that 512 data bytes (for a 64×64 pixel resolution bitmap) will be transmitted to the identified LCD key, whereas the presence of a lamp address identifies the lamp whose mode will be established by a lamp mode code supplied via data latch 1226.

If the data strobeline 1210 is activated, the data bits received on the data lines 1206 will contain an 8-bit segment of bit map data being sent to a particular LCD keyswitch 1116 to create a specific legend on the LCD, or an 8 bit code indicating a lamp mode setting. Bitmap and lampmode data bits are sequentially latched from the buffer 1214 into a latch 1226 from which they are passed to a parallel-to-serial converter 1228, under the control of a clock 1230, and then to the particular LCD key or lamp register designated by the address previously received into latch 1216.

The keypad interface circuitry may advantageously include a serial, non-volatile memory unit 1222 for holding the default bit maps to be displayed on the LCD keyswitches 1116 whenever the system has been initialized, reset, or powered down. Reset is controlled by the computer 100 via the RESET strobeline 1224 on the 25-way connector block 1110. The default bitmaps advantageously produce a keypad display as those shown in FIG. 4 of the drawings (as used for the MANUAL modestate), except that the "Main Menu" key display is replaced by the display of asterisk "*" to reproduce completely the conventional touchtone keypad symbols. By locally storing the default keypad displays, the display keypad 126 may be used to operate the phone device in the conventional fashion, even when the computer 100 is disconnected or powered down. The non-volatile memory 1222 may be loaded from the computer 100 using the data strobe 1210 when a suitable control code is loaded int the control latch 1234.

If the control strobeline 1212 is activated, the data bits received are passed into a latch 1234 from which they are passed to the telephone set microcontroller 1104 or equivalent phone device mechanisms to control instrumentalities including the speaker phone, the alphanumeric display panel, etc. as previously. The control strobeline 1212 is used to send commands to the standard telephone circuitry illustratively indicated at 1102 in FIG. 11. When the control strobeline 1212 is pulsed, the datalines 1206 will contain bits representing various control commands and are are latched from the buffer 1214 to a control bit latch 1234 and thence through conventional circuitry to the microcomputer 1104 or other parts of the interface. The control commands transferred via the datalines 1206 into latch 1234 are codes written by the phone device service provider after being placed in I/O data latches (not shown) in interface circuit 140 seen in FIG. 1, including codes for turning the speakerphone 1126 on or off and changing the volume of the speakerphone or the handset. Control commands may also include character strings sent to the display LCD 1130 under the control of the microcontroller 1104.

Figure 13:
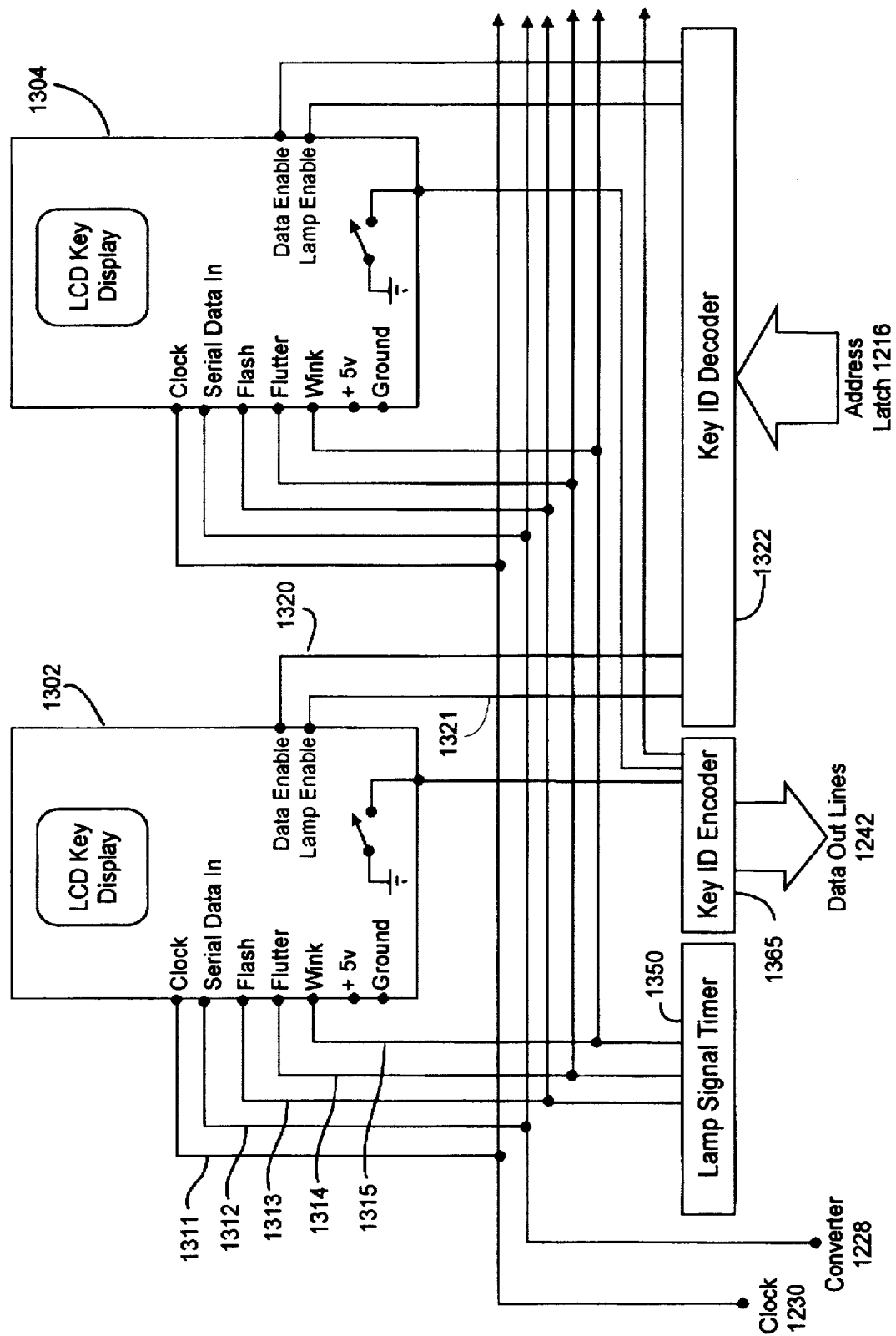
FIG. 13 is a logical block diagram illustrating the interconnections between the LCD keyswitches and the LCD keyswitch driver circuits utilized in the phone device of FIG. 11.

FIG. 13 of the drawings illustrates an illustrative keypad interface logic circuit in more detail. Two of the twelve identical LCD display key modules are indicated in block form at 1302 and 1304. The module 1304 includes a clock signal input 1311 for timing the transfer of serial data into a serial data input 1312 for transferring display bitmaps and backlighting lamp mode selections into the keyswitch module. As noted previously, if the LCD panel in each keyswitch displays a 64×64 pixel bitmap, 512 bytes of data are transferred serially into each keyswitch when the data enable line 1320 is enabled by a key ID decoder 1322 which receives the button/lamp address code from latch 1216 (FIG. 12) indicating the particular button or backlighting lamp for which data is being sent over the serial data line 1312. If the address code indicates that a lamp is being loaded, the serial data line 1312 receives a byte which specifies which lamp (white, red or green) state is to be changed as well as the new mode for that lamp. A lamp mode timing signal generator 1350 provides shared flash, flicker and wink energization signals via the shared lamp power lines 1313, 1314 and 1315 respectively.

When an LCD keyswitch, such as the switch 1350 seen in module 1302, has been depressed or released by a user, this information is converted into the appropriate button action code by a key ID encoder 1365 which sends an interrupt signal via line 1236 in the interface 112 to the connected computer 100 whenever a keyswitch is pressed or released. The interface microcontroller 1220 also receives the 4-bit address (button number) of the particular LCD keyswitch 1116 that was activated. A fifth bit on lines 1242 is used to indicate whether the key activation associated with the interrupt is a key press or a key release. These output bits are transferred via the interface connection 112 to the computer 100 where they are placed on the system databus concurrently with the activation of a system bus interrupt request line. The phone device driver routines 165 include an interrupt handler which formats the button identification into a the formate defined for a TAPI button message and pass that message via the TAPI SPI to the TAPI DLL which in turn passes the PHONE_BUTTON message via the applications callback function for handling by the control program thread. The phone device may also supply status information from the microcomputer 1104 using the same hardware/software interface to support those TAPI status reporting functions which characterize the nature and status of the connected phone device.

In the preferred embodiment the twelve LCD display keys such as those seen at 1302 and 1304 house the display in the moveable portion of the key, with the contact portion behind the movable section of the key. Such moveable, relegendable keyswitches suitable for use with the present invention are conventional and are described, for example, in European Patent No EP-A-0 232 137 assigned to Dowty Electronic Components Limited, to which reference may be made for further details. Alternatively an LCD keyswitch having a fixed display with a transparent moveable cap, such as is described in U.S. Pat. No. 4,897,651 (DeMonte) or British Patent No. GB-A-2 150 722 (Muller), may be used to implement the present invention.

The keyswitches 1302 and 1304 physically move in push-button fashion when pressed and provide tactile feedback to the user. As a result, the display keyswitchs operate in a manner fully consistent with the user's experience with the familiar "push-buttons" in conventional touch-tone telephone sets. The similar appearance and feel of the movable keys used to implement the display keyswitches as contemplated by the present invention contributes importantly to the intuitive ease with which the phone device according to the present invention can be used.

In the illustrative embodiment of the invention which has been described, each LCD keyswitch display may be selectively backlit by each of three separate colors, white, red, and green, using several lighting patterns: on full, flashing, flutter, winking or off Provision of several distinctive lamp colors for keyswitch backlighting is accomplished by associating two lamp/dummy button pairs with one lamp/active button pair and then addressing each lamp individually.

The independent control of backlighting and the bitmap displays permits the application developer to readily provide special capabilities. For example, different colors or lamp modes may be used to differentiate keys which perform functions from keys used merely to display information. Alternatively, different colors may be used to indicate status conditions; for example, keys labeled "Spkr Phone" and "Call Waiting" may be backlit in white when the speakerphone and call waiting are respectively turned off, with each key becoming backlit in green when the indicated function is turned ON. To emulate a key telephone, keys indicating different lines which are active, held, etc. may be backlit in white, white flashing, or red to indicate various states.

Figure 14:
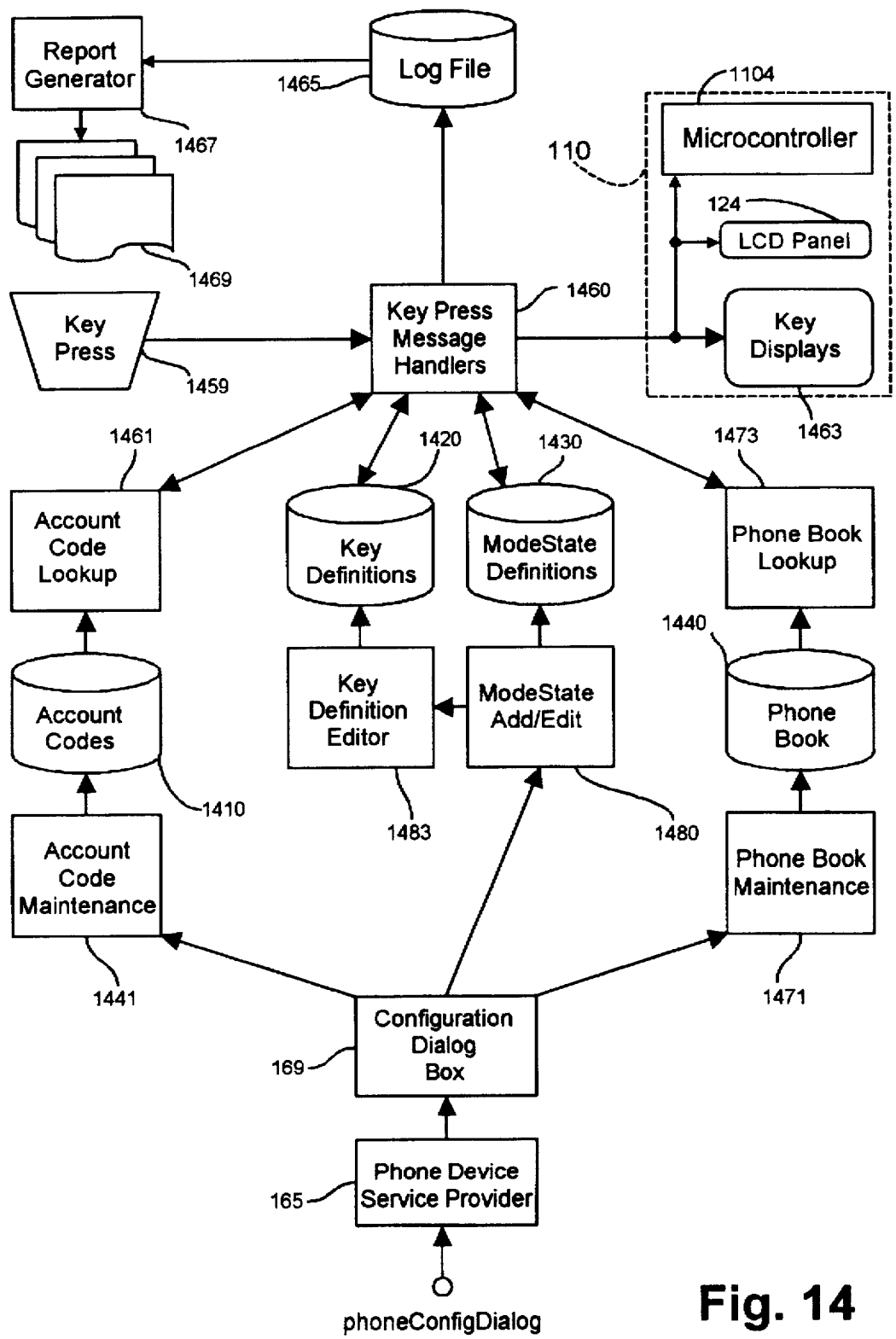
FIG. 14 illustrates the data file mechanism and program flow control used in the preferred embodiment.

FIG. 14 of the drawings shows the principal data structures maintained and manipulated by the preferred embodiment of the invention. These data structures take the form of files persistently stored in the mass storage system of the computer 100 and include an account code file 1410, a key definition file 1420, a modestate definition file 1430, and a phone book file 1440.

The account code file 1410 preferably takes the form of a conventional relational database file containing information about accounts to which particular telephone calls may be charged. The account code file 1410 may typically be an existing database which is maintained by an existing records management system 1441 which may be invoked normally or from the phone device configuration dialog box 169 to add, edit or delete account identification records. When the phone device 110 is in operation, a selected key in a selected state (e.g. the "Bill To" key in the MAIN modestate as depicted in FIG. 3) causes a message handling function at 1460 to invoke an account table lookup function 1461 which returns desired account identifiers from the account code database 1410 to a message handling function at 1460. The account code file 1410 is preferably indexed by a displayable account identifier field so that account identifiers can be accessed and displayed in alphabetical order by name to provide a multi-level access sequence of displayed choices to the user, as illustrated by FIGS. 7 and 8. The message handler converts the received account identifiers into suitable display bitmap form for transmission to the key displays indicated at 1463 in FIG. 14. While a predetermined display bitmap could be stored in each account identification record file to visually designate each account, Windows GDI functions may be advantageously used to convert numeric or character string account identifiers into bitmap data structures suitable for transmission to the key displays 1463. After the user has selected a particular accounting code from the file 1410 using the display keypad, that code is thereafter placed in a telephone connection record, along with connection start and stop times and the identification (telephone number) of the connected party, the resulting connection record being appended to the log file 1465 which may processed at any time by a report generator program 1467 to produce accounting reports as indicated at 1469.

In a similar fashion, the phone book file 1440 may take the form of a relational database which is maintained by a conventional phone book maintenance program 1471 which may also be invoked from the phone device configuration dialog box 169 via the phone service provider DLL 165 in response to a TAPI phoneConfigDialog function invocation by an executing application program as previously discussed. When the user presses a predetermined key in a predetermined modestate (e.g. the "Phone Book" key in the MAIN modestate as seen in FIG. 3), a message handler at 1460 invokes a phone book lookup routine 1473 which returns identification data for designated callable parties, and this identification data is then displayed on the display keys 1463 to permit the user to select the party to be dialed.

The phone book database file 1440 is also advantageously indexed by phone number such that, when caller I.D. services are available from the connected telephone service provider, the telephone number from which an incoming call originates may be checked against the database 1440 and, if a match exists, descriptive text identifying the incoming caller may be transmitted from the database 1440 to the LCD display panel seen at 124 in FIG. 1. In a similar fashion, a short form text description of each callable party in the database 1440 is passed in bitmap form to the display keys 1463 by the lookup routine 1473 to permit the user to select a party to be dialed and, after the connection is established, a longer text description of the party with whom the connection has been established may be transmitted from the database 1440 to the LCD display 124 (as seen in the example of the call in progress modestate display seen in FIG. 10).

In order to program the operation of the phone set 110 from the computer 100, the configuration dialog box 169, at the users request, invokes a modestate editor seen at 1480 which adds, deletes or edits records in the modestate definition database 1430. Records in the file 1430 define each modestate by specifying a modestate variable for each modestate, the default alphanumeric string to be displayed on panel 124 when that modestate is active, and a set of twelve key definition identifiers each identifying a particular key definition in the file 1430. Using the modestate editor 1430, the an installer/developer can create or modify new modestates defining new sets of keys.

The appearance and function of individual keys is determined using a key definition editor 1483 callable from the modestate editor 1480. The modestate editor advantageously displays the appearance of the twelve keys and the LCD panel in graphical form, identifies the modestate name, and permits the user to "right click" on any key display to specify the characteristics of that key.

The key definition editor allows the user to create a graphical bitmap for each key using the Windows GDI from an existing bitmap image or from specified fields in a database containing character or metafile data which can be converted into a bitmap at execution time by the Windows GDI, together with a stored code indicating the default backlighting mode for each backlight color for that key.

In addition to the bitmap and backlight mode definitions for each key, each key definition record in the database 1425 further contains a specification of the functions to be performed when that key is pressed. To this end, the key definition editor 1483 advantageously includes a script file editor for editing a macro language file which specifies the function, or sequence of functions, to be performed when each key in each modestate is actuated by the user. In operation, when a key whose display and backlight mode is defined in a predetermined the key definition record is actuated, a keypress message handler then obtains and interprets the macro script recorded for that key in its key definition record, thereby performing previously programmed operations, including switching the system to a new designated modestate and/or performing one or a sequence of functions specified by statements in the script file. The script file for a given key may be readily programmed to perform a script driven sequence of operations to dial and log onto a remote computer and thereafter to perform automated data transfer functions and the like.

When several phone devices are used in a networked environment, the account code file 1410, the phone book file 1440, the mode state definition file 1430 and the key definition file 1420 may be shared by all devices, or may that information may be stored in a combination of shared files containing shared data and locally stored files containing data which is private to a particular user.

It is to be understood that the embodiment of the invention which has been described is merely illustrative on one application of the principles of the invention. Numerous telephony functions which can be selected and controlled by means of the phone device display keypad may be added to supplement or substitute for the functions described to meet the needs of particular users and to take advantage of different capabilities available in particular installations. The features of the disclosed embodiment should accordingly be considered to be merely illustrative applications of the principles of the inventions, recognizing that numerous additions and modifications may be made by those skilled in the art without departing from the true spirit and scope of the invention.

What is claimed is:

1. Telephone station equipment manipulatable by a user comprising, in combination:

a line circuit for establishing a telephone communication channel, a telephone handset consisting of a mouthpiece microphone and an earpiece speaker, a hook switch for connecting and disconnecting said handset and said line circuit, a manually manipulatable keypad consisting of a plurality of movable display keys that are actuated by moving the key, each of said display keys comprising both sensing means for detecting the actuation of said key by said user and display means for visually presenting alterable display information to said user, a programmable computer, and a keypad interface circuit for interconnecting said computer and said keypad, said keypad interface consisting of:

input circuit means for transmitting keypress signals indicative of the actuation of each of said keys to said computer to initiate functions designated by said display information and output circuit means for transmitting said alterable display information from said computer to said individual key displays as required for one or more of said initiated functions.

2. Telephone station equipment as set forth in claim 1 further comprising a control program executable by said computer, said program comprising:

means coupled to said output circuit means for transmitting display information to said keypad, including information for display by one or more predetermined keys representing a corresponding set of one or more key-selectable functions, and means responsive to a keypress signal indicating the actuation of a selected one of said predetermined keys for performing the corresponding one of said key-selectable functions.

3. Telephone station equipment as set forth in claim 2 wherein said means responsive to a keypress signal indicating the actuation of a selected one of said predetermined keys comprises means for applying a dialing signal to said line circuit for establishing a telephone connection to a particular called party identified by the display information exhibited by said selected one of said keys.

4. Telephone station equipment as set forth in claim 3 wherein said means for applying a dialing signal comprises:

means for displaying the identification of a plurality of dialable parties on a corresponding first set of said keys, and means responsive to the actuation of a given one of said first set of said keys for establishing a dialed connection to the party identified on display of said given key.

5. Telephone station equipment as set forth in claim 4 wherein said means for applying a dialing signal further comprises:

means for displaying the identification of a group of dialable parties on each of a second set of said keys, and means responsive to the actuation of a particular key in said second set for activating said means for displaying the identification of a plurality of dialable parties.

6. Telephone station equipment as set forth in claim 3 wherein said means for applying a dialing signal comprises means for displaying a representation of a manual dialing function on a selected one of said keys, means responsive to the actuation by the user of said selected key for displaying a representation of a different dialable digit on each of a plurality of said keys, and means responsive to the actuation by the user of a key displaying a given dialable digit for generating a dialing signal representing said given dialable digit.

7. Telephone station equipment as set forth in claim 3 further including means for placing a connection established to a particular party on a hold comprising, in combination, means for displaying a representation of a hold condition on a predetermined one of said keys and means responsive to the actuation by said user of said predetermined key for disconnecting said telephone handset from said line circuit without breaking the connection between said line circuit and said station equipment.

8. Telephone station equipment as set forth in claim 3 further including speakerphone apparatus comprising a pickup microphone and loudspeaker separate from said handset, means for displaying a representation of said speakerphone on a preselected key, and means responsive to the actuation by said user of said preselected key for activating said speakerphone apparatus.

9. Telephone station equipment as set forth in claim 3 further comprising means for persistently storing a telephone connection record for each telephone connection established, said record including an identification of the connected party and the time at which said connection was established.

10. Telephone station equipment as set forth in claim 9 wherein said record further includes information defining the duration of said connection.

11. Telephone station equipment as set forth in claim 9 further including means for displaying on each of a collection of said keys a category representation and means responsive to actuation of one of said collection of keys for recording a category identifier corresponding to said category representation in said record.

12. Telephone station equipment as set forth in claim 3 further including a display device independent of said display keypad for displaying alphanumeric information, and means for selectively displaying status information to said user on said display device, said status information including the an identification of party with whom the current connection is established.

13. Telephone station equipment manipulatable by a user for establishing a telephone communication connection over a telephone line circuit to a remote party, said equipment comprising, in combination:
   a telephone station set comprising:
      a microphone for accepting audio information from said user,
      a speaker for delivering audio information to said user, and
      a manually manipulatable keypad consisting of a plurality of display keys, each of said display keys comprising a movable push-button manipulatable by said user, sensing means for detecting the depression and release of said push-button by said user, and writable display means positioned on the exposed face of said push-button for visually exhibiting alterable display information to said user,
   a programmable computer, and
   a keypad interface circuit for interconnecting said computer and said keypad, said keypad interface consisting of:
      input circuit means for transmitting keypress signals indicative of the actuation of each of said keys to said computer to initiate functions designated by said display information and
      output circuit means for transmitting said alterable display information from said computer to said individual key displays as required for one or more of said initiated functions.

14. Telephone station equipment as set forth in claim 13 wherein each of said display keys further comprises means for exhibiting said display information in different colors and wherein said keypad interface further includes means for transmitting display control information to each of said display keys from said computer to specify the color of said display information.

15. Telephone station equipment as set forth in claim 13 wherein each of said display keys includes graphical display screen mounted on the face said key for displaying images defined by image data transmitted from said computer.

16. Telephone station equipment as set forth in claim 15 further including a controllable light source associated with each of said display keys for illuminating said display screen in accordance with an illumination value supplied to each of said display keys from said computer.

17. Telephone station equipment as set forth in claim 16 further comprising a control program executable by said computer, said program comprising:
   means coupled to said output circuit means for transmitting display information to said keypad, including information for display by one or more predetermined keys representing a corresponding set of one or more key-selectable functions, and
   means responsive to a keypress signal indicating the actuation of a selected one of said predetermined keys for performing the corresponding one of said key-selectable functions.

18. Telephone station equipment as set forth in claim 16 wherein said means responsive to a keypress signal indicating the actuation of a selected one of said predetermined keys comprises means for applying a dialing signal to said line circuit for establishing a telephone connection to a particular called party identified by the display information exhibited by said selected one of said keys.

19. Telephone station equipment as set forth in claim 18 wherein said means for applying a dialing signal comprises:
   means for displaying the identification of a plurality of dialable parties on a corresponding first set of said keys, and
   means responsive to the actuation of a given one of said first set of said keys for establishing a dialed connection to the party identified on display of said given key.

20. Telephone station equipment as set forth in claim 18 wherein said means for applying a dialing signal further comprises:
   means for displaying the identification of a group of dialable parties on each of a second set of said keys, and
   means responsive to the actuation of a particular key in said second set for activating said means for displaying the identification of a plurality of dialable parties.

21. Telephone station equipment as set forth in claim 16 wherein said means for applying a dialing signal comprises means for displaying a representation of a manual dialing function on a selected one of said keys, means responsive to the actuation by the user of said selected key for displaying a representation of a different dialable digit on each of a plurality of said keys, and means responsive to the actuation by the user of a key displaying a given dialable digit for generating a dialing signal representing said given dialable digit.

22. Telephone station equipment as set forth in claim 16 further including means for placing a connection established to a particular party on a hold comprising, in combination, means for displaying a representation of a hold condition on a predetermined one of said keys and means responsive to the actuation by said user of said predetermined key for disconnecting said telephone handset from said line circuit without breaking the connection between said line circuit and said station equipment.

23. Telephone station equipment as set forth in claim 16 further including speakerphone apparatus comprising a pickup microphone and loudspeaker separate from said handset, means for displaying a representation of said speakerphone on a preselected key, and means responsive to the actuation by said user of said preselected key for activating said speakerphone apparatus.

24. Telephone station equipment as set forth in claim 16 further comprising means for persistently storing a telephone connection record for each telephone connection established, said record including an identification of the connected party and the time at which said connection was established.

25. Telephone station equipment as set forth in claim 24 wherein said record further includes information defining the duration of said connection.

26. Telephone station equipment as set forth in claim 25 further including means for displaying on each of a collection of said keys a category representation and means responsive to actuation of one of said collection of keys for recording a category identifier corresponding to said category representation in said record.

27. A telephone system control mechanism comprising, in combination:

- a telephone communications circuit for establishing connections with remote parties,
- a display keypad consisting of a plurality of movable push-button keys each given key including a display panel positioned on the exposed face of said given key for displaying an visual image to a user, said image being defined by display data, and
- a sensor for generating keypress signals whenever said given key is actuated by said user,
- a personal computer including a memory and a processor for executing programs stored in said memory, said programs including a control program, said personal computer comprising:

means for placing said computer in a first of a plurality of mode states, means responsive to the activation of a selected one of said keys when said computer is in said first mode state for performing an operation signified by the image displayed on the face of said selected key, means for switching said computer to a different mode state specified by said selected key to thereafter process the activation of said keys in said different mode state, and means coupled to said display keypad for transmitting said display data to said keys to represent at least one function executable by said processor in said different mode state.

* * * * *